(12) United States Patent
Mitsui

(10) Patent No.: US 9,223,521 B2
(45) Date of Patent: Dec. 29, 2015

(54) INFORMATION PROCESSING APPARATUS, RECORDING MEDIUM, AND CONTROL METHOD

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 13/608,275

(22) Filed: Sep. 10, 2012

(65) Prior Publication Data

US 2013/0063753 A1  Mar. 14, 2013

(30) Foreign Application Priority Data

Sep. 12, 2011 (JP) ................................ 2011-198164
Jun. 26, 2012 (JP) ................................ 2012-143141

(51) Int. Cl.
*G06F 3/12* (2006.01)
*G06K 15/00* (2006.01)

(52) U.S. Cl.
CPC ............ *G06F 3/1204* (2013.01); *G06F 3/1253* (2013.01); *G06K 15/00* (2013.01); *G06F 3/1297* (2013.01)

(58) Field of Classification Search
USPC ............................. 358/1.13, 1.15, 1.14, 1.16
See application file for complete search history.

(56) References Cited

U.S. PATENT DOCUMENTS

| | | | |
|---|---|---|---|
| 7,460,253 B2* | 12/2008 | Osada | 358/1.13 |
| 7,812,976 B2* | 10/2010 | Perry et al. | 358/1.12 |
| 7,865,891 B2* | 1/2011 | Saito | 717/170 |
| 2006/0158674 A1* | 7/2006 | Mizoguchi | 358/1.13 |
| 2006/0218541 A1 | 9/2006 | Saito | |
| 2007/0146784 A1 | 6/2007 | Perry | |

FOREIGN PATENT DOCUMENTS

| | | |
|---|---|---|
| CN | 101051257 A | 10/2007 |
| JP | 2006-331339 A | 12/2006 |

* cited by examiner

*Primary Examiner* — Vu B Hang
(74) *Attorney, Agent, or Firm* — Canon USA Inc. IP Division

(57) ABSTRACT

An information processing apparatus is configured to change a name of a print setting item and a display method of an option depending on application, or change display control depending on an execution environment in which the application is running.

11 Claims, 16 Drawing Sheets

FIG.6

```
<?xml version="1.0" encoding="UTF-8" ?>
<psf:PrintTicket
---------(SKIP)---------
>
   <psf:Feature name="psk:PageMediaSize">
     <psf:Option name="psk:NorthAmericaLetter">
       <psf:ScoredProperty name="psk:MediaSizeWidth">
         <psf:Value xsi:type="xsd:integer">215900</psf:Value>
       </psf:ScoredProperty>
       <psf:ScoredProperty name="psk:MediaSizeHeight">
         <psf:Value xsi:type="xsd:integer">279400</psf:Value>
       </psf:ScoredProperty>
     </psf:Option>
   </psf:Feature>
   <psf:Feature name="psk:PageOrientation">
     <psf:Option name="psk:Portrait" />
   </psf:Feature>
   <psf:ParameterInit name="psk:JobCopiesAllDocuments">
     <psf:Value xsi:type="xsd:integer">1</psf:Value>
   </psf:ParameterInit>
</psf:PrintTicket>
```

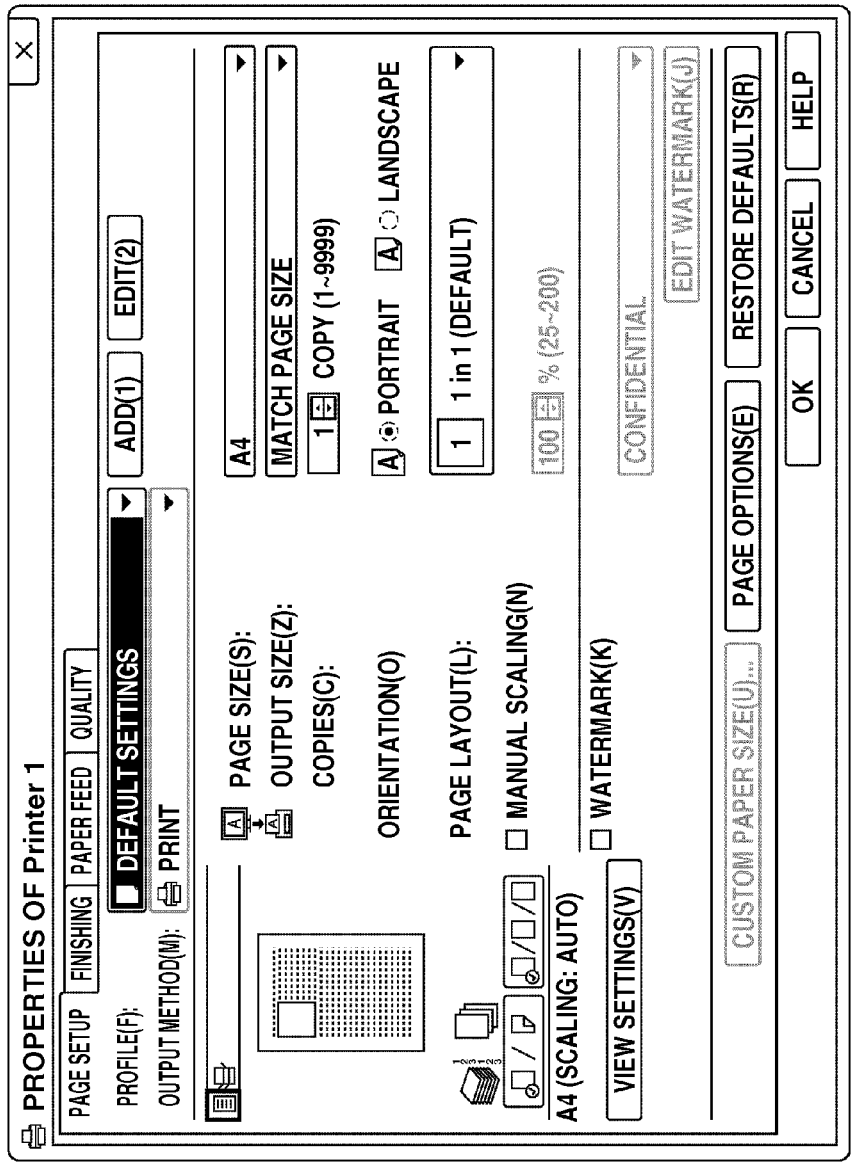

FIG.9

```
IDR_DLG_CM_PAGESETUP DIALOG DISCARDABLE  0, 0, 352, 262
STYLE WS_CHILD
FONT 9, "MS P GOTHIC"
BEGIN
    LTEXT "PROFILE(&F) :",IDC_ST_PROFILE,4,9,52,8
    COMBOBOX IDC_CB_PROFILE,60,4,90,100,CBS_DROPDOWNLIST | CBS_O
WNERDRAWFIXED | CBS_HASSTRINGS | WS_VSCROLL | WS_TABSTOP
    CONTROL "ADD PROFILE",IDC_PB_ADDPROFILE,"Button",BS_OWNERD
RAW | WS_GROUP | WS_TABSTOP,153,3,19,19
    CONTROL "EDIT PROFILE",IDC_PB_EDITPROFILE,"Button",BS_OWNER
DRAW | WS_TABSTOP,171,3,19,19
    LTEXT "OUTPUT METHOD(&M) :",IDC_ST_JOBOPERATIONS,205,9,50,8
    COMBOBOX  IDC_CB_JOBOPERATIONS,259,4,77,125,CBS_DROPDOWNLIS
T | CBS_OWNERDRAWFIXED | CBS_HASSTRINGS | WS_VSCROLL | WS_
TABSTOP
    CONTROL "",IDC_PB_JOBOPERATIONS_DETAILSSETTING,"Button",BS_O
WNERDRAW | WS_TABSTOP,339,3,9,17
    CONTROL "LOCK",IDC_PB_CHANGE_PAGECOMPOSER,"Button",BS_OWNE
RDRAW | WS_TABSTOP,339,3,9,17
    CONTROL "",IDC_SL_LINE1,"Static",SS_ETCHEDHORZ,4,26,344,1
    CONTROL "",IDC_SB_PREVIEW_PAGESETUP,"Static",SS_BITMAP | SS_NO
TIFY,4,32,105,175
    ICON  IDR_ICO_DOCSIZE,IDC_SI_STATIC1,122,31,20,20,WS_DISABLED
    LTEXT "PAGE SIZE(&S) :",IDC_ST_PAGESIZE,140,34,65,8
    COMBOBOX  IDC_CB_PAGESIZE,213,32,135,90,CBS_DROPDOWNLIST | W
S_VSCROLL | WS_TABSTOP
    ICON IDR_ICO_PSIZE,IDC_SI_STATIC2,122,51,20,20,WS_DISABLED
    LTEXT "OUTPUT SIZE(&Z) :",IDC_ST_OUTPUTSIZE,140,55,65,8
    COMBOBOX IDC_CB_OUTPUTSIZE,213,52,135,90,CBS_DROPDOWNLIST |
WS_VSCROLL | WS_TABSTOP
    LTEXT "COPIES(&C) :",IDC_ST_COPY,139,72,45,8
    EDITTEXT   IDC_ED_COPY,213,70,31,13,ES_RIGHT | ES_NUMBER
    CONTROL    "",IDC_UD_COPY,UPDOWN_CLASS,UDS_SETBUDDYINT | U
DS_ALIGNRIGHT | UDS_AUTOBUDDY | UDS_ARROWKEYS | UDS_NOTH
OUSANDS,238,70,6,13
    LTEXT "COPY",IDC_ST_COPY2,246,72,104,8
    GROUPBOX "ORIENTATION(&T)",IDC_GB_ORIENTATION,133,88,215,39
    ICON   IDR_ICO_PORT_J,IDC_SI_STATIC3,192,99,20,20,WS_DISABLED
    ICON   IDR_ICO_LAND_J,IDC_SI_STATIC4,272,99,20,20,WS_DISABLED
    CONTROL "PORTRAIT",IDC_RB_ORIENTATION_PORTRAIT,"Button",BS_AUTORA
DIOBUTTON | WS_GROUP | WS_TABSTOP,213,106,50,10
    CONTROL "LANDSCAPE",IDC_RB_ORIENTATION_LANDSCAPE,"Button",BS_AUTOR
ADIOBUTTON,293,106,50,10
    LTEXT "PAGE LAYOUT(&L) :",IDC_ST_PAGELAYOUT,128,140,75,8
    COMBOBOX IDC_CB_PAGELAYOUT,213,132,135,500,CBS_DROPDOWNLIS
T | CBS_OWNERDRAWFIXED | CBS_HASSTRINGS | WS_VSCROLL | WS_
TABSTOP
 ……
```

FIG.10A

PRINT SETTINGS

PAPER SIZE

ORIENTATION

PAPER SOURCE

COLOR

MEDIA TYPE

FIG.10B

PAPER SIZE

○ LETTER

○ LEDGER

⊙ A4

○ B4

○ A3

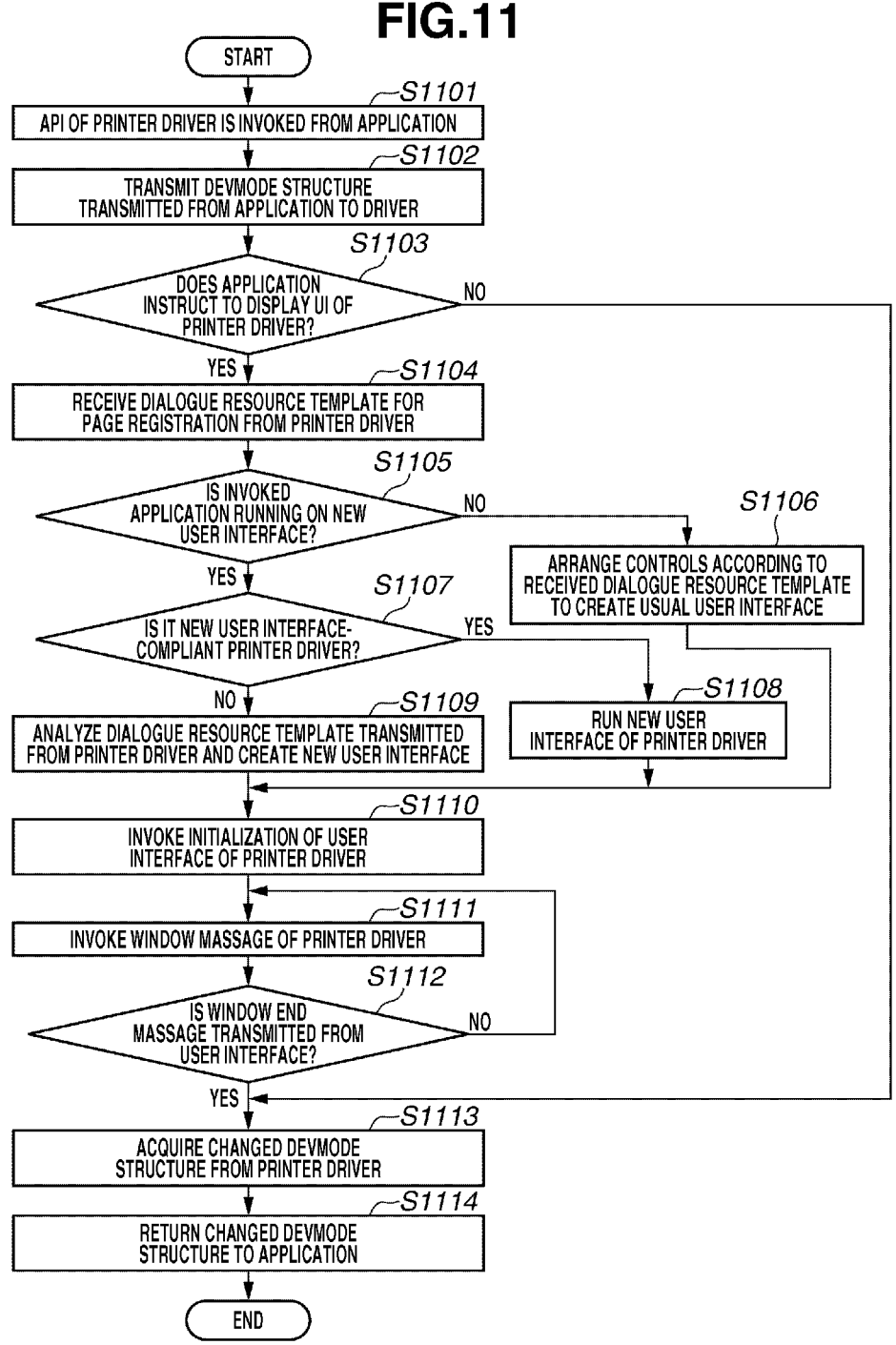

FIG.15A FIG.15B     FIG.15C     FIG.15D

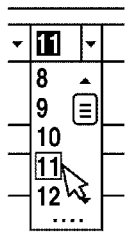

☑ Clock    Display name:
☐ Volume                                       OK
☐ Network
☐ Power

FIG.15J

| Buttons | Pointers | Pointer Options | Wheel | Hardware |

FIG.15G     FIG.15H         FIG.15I

▲ ☐ Desktop
  ▷ ☐ Jonathan
  ▷ ☐ Public

FIG.15E
  ▲ ☐ Computer
    ▷ ☐ Local Disk(C:)

List of valid modes:
    ▷ ☐ New Volume(D:)

| 1680 by 1050, True Color (32 bit), 60 Hertz |
| 1680 by 1050, High Color (16 bit), 60 Hertz |
| 1680 by 1050, 256 Colors, 60 Hertz |
| 1280 by 1024, True Color (32 bit), 60 Hertz |
| 1280 by 1024, High Color (16 bit), 60 Hertz |
| 1280 by 1024, 256 Colors, 60 Hertz |
| 1280 by 800, True Color (32 bit), 60 Hertz |
| 1280 by 800, High Color (16 bit), 60 Hertz |
| 1280 by 800, 256 Colors, 60 Hertz |

▷ ☐ DVD Drive(F:)
       ☐ My Sharing Folders
  ▷ ☐ Network
  ▷ ☐ Control Panel
    ☐ Recycle Bin
    ☐ New Folder

FIG.15F

| Name ▲ | Date taken | Tags | Size | » |
|---|---|---|---|---|
| ☐ Autumn Leaves | | | | |
| ☐ Creek | | | | |
| ☐ Desert Landscape | | | | |
| ☐ Dock | | | | |
| ☐ Forest | | | | |
| ☐ Forest Flowers | | | | |
| ☐ Frangipani Flowers | | | | |

INFORMATION PROCESSING APPARATUS, RECORDING MEDIUM, AND CONTROL METHOD

BACKGROUND OF THE INVENTION

1. Field of the Invention

The present invention relates a technique for providing a user interface for print setting.

2. Description of the Related Art

A printer driver is provided with a dedicated user interface to perform detailed print setting. In printing with use of an application, a user presses a button for performing detailed setting, and in response to the operation, the user interface of the printer driver is invoked through an operating system. If the operation varies depending on manufacturers or models, the user has difficulty using the user interfaces. To solve the problem, a tab-format property sheet is provided. The printer driver adds a page to the individual tabs according to the operating system to create a user interface.

In recent years, in addition to conventional user interfaces for pointing devices, operating systems capable of changing the user interface to a user interface that can be easily operated on a touch panel have been provided. The change of the user interfaces of the operating system requires change of user interfaces of the printer driver. This requires a new printer driver.

However, the creation of the new printer driver for all existing printers is troublesome, and the users cannot use the printers until the creation is completed. To maintain the compatibility with the conventional printer driver which is currently running, an operating system capable of switching the screen from a new user interface and invoking the conventional user interface is provided.

Further, a new user interface may be dynamically established without displaying the conventional user interface. Further, Japanese Patent Application Laid-Open No. 2006-331339 discusses a method of providing a plurality of layout definition files and selecting a layout depending on a displaying device.

SUMMARY OF THE INVENTION

According to an aspect of the present invention, an information processing apparatus comprising a control unit configured to simultaneously display a name of a print setting item and an option of the print setting item if first application instructs to display a print setting screen of a printer driver; erase a name of a second print setting item and display an option of the first print setting item in response to an indication of a name of a first print setting item if second application instructs to display the print setting screen of the printer driver; and erase the name of the first print setting item and further display an option of the second print setting item in response to an indication of the name of the second print setting item if second application instructs to display the print setting screen of the printer driver; wherein the first print setting item and the second print setting item are different.

According to another aspect of the present invention, an information processing apparatus comprising:

a control unit configured to receive layout information containing a type of a control and an ID of a function corresponding to the control from a printer driver;

the control unit further configured to determine whether the application that invoked the printer driver is being executed in a first execution environment or in a second execution environment; and the control unit further configured to display a user interface according to the layout information if the application is being executed in the first execution environment, and replace the control described in the layout information with a control of a user interface in the second execution environment and display the control if the application is being executed in the second execution environment;

wherein the first execution environment and the second execution environment are different.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an XML-format print ticket as print settings used in the XPS print processing system according to the exemplary embodiment of the present invention.

FIG. 7 illustrates a user interface of a printer driver according to the exemplary embodiment of the present invention.

FIG. 9 illustrates a dialogue resource template for establishing a user interface in the printer driver according to the exemplary embodiment of the present invention.

FIGS. 10A and 10B are user interfaces of a printer driver serving as a new user interface of touch panel created by an operating system according to the exemplary embodiment of the present invention.

FIG. 11 is a flowchart for the processing performed when the operating system invokes the user interface of the printer driver according to the exemplary embodiment of the present invention.

FIGS. 15A to 15J illustrate conventional controls of the operating system according to the exemplary embodiment of the present invention.

DESCRIPTION OF THE EMBODIMENTS

Various exemplary embodiments, features, and aspects of the invention will be described in detail below with reference to the drawings.

In the method of switching a screen to display a conventional user interface, the screen that is not suitable for a touch panel is displayed, and this suddenly makes the operation troublesome for the user. In the method of selecting a screen from a plurality of layouts, since the plurality of layouts are to be provided for the printer driver, a conventional printer driver cannot be used as it is. Further, if the method of rearranging, scaling, and moving parts is performed on a user interface, in a case where the parts are not suitable for the touch panel, the operability decreases even though the layout is changed. Hereinafter, a program for an operating system is described, which lays out a user interface of a printer driver in a form suitable for a terminal that displays the user interface.

Figure 1:
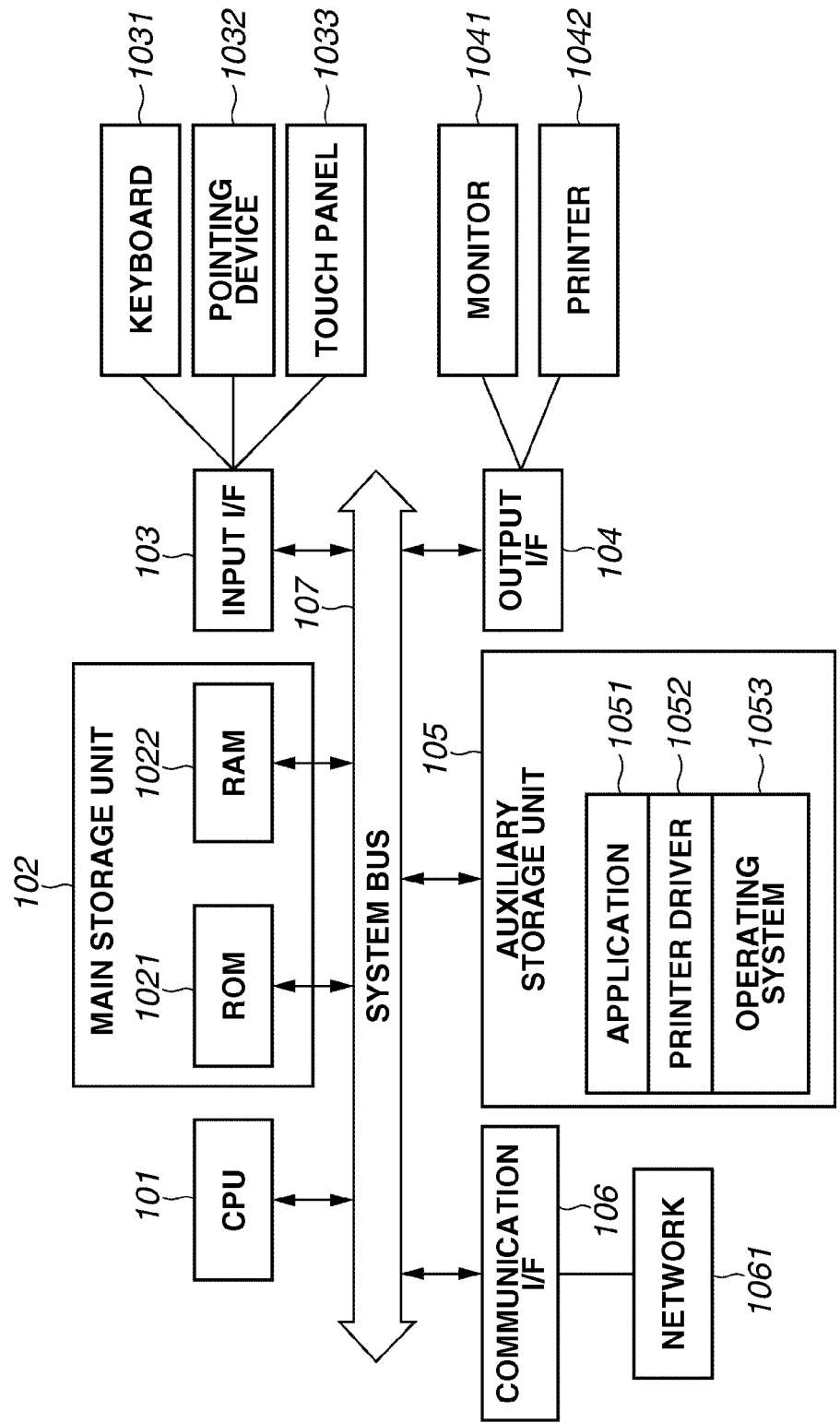
FIG. 1 is a block diagram illustrating hardware and software of a computer system according to an exemplary embodiment of the present invention.

FIG. 1 is a block diagram of the system employing a general computer according to an exemplary embodiment of the present invention. Unless otherwise mentioned, as long as the functions according to the exemplary embodiment can be implemented, the exemplary embodiment of the present invention can be applied to any single function, any system including a plurality of devices, or any system performing the processing connected via a network.

A central processing unit (CPU) 101 (corresponding to a control unit) performs overall control of the device according to a program stored in a read-only memory (ROM) 1021 or a random access memory (RAM) 1022 in a main storage unit 102 or an auxiliary storage unit 105. The RAM 1022 is also used as a work area for the CPU 101 in performing various kinds of processing. The auxiliary storage unit 105 stores an operating system (OS) 1053, application software 1051, and the like. Input devices such as a keyboard 1031, a pointing device 1032 represented by a mouse, and a touch panel 1033 are used when a user gives various instructions to the computer via an input interface (I/F) 103. An output I/F 104 is an interface used to output data to an output device such as a monitor 1041 and a printer 1042. The output I/F 104 can be connected not only directly to a printer 1042 via a local I/O, but also to a network 1061 via a communication I/F 106. A common system bus 107 is used to transmit or receive data among the I/F and modules.

With the above-described configuration, the CPU 101 executes processing according to a program stored in the auxiliary storage unit 105, and thereby the software configuration of the computer illustrated in FIGS. 3 and 4 and the processing in each step in the flowcharts described below can be implemented.

Figure 2:
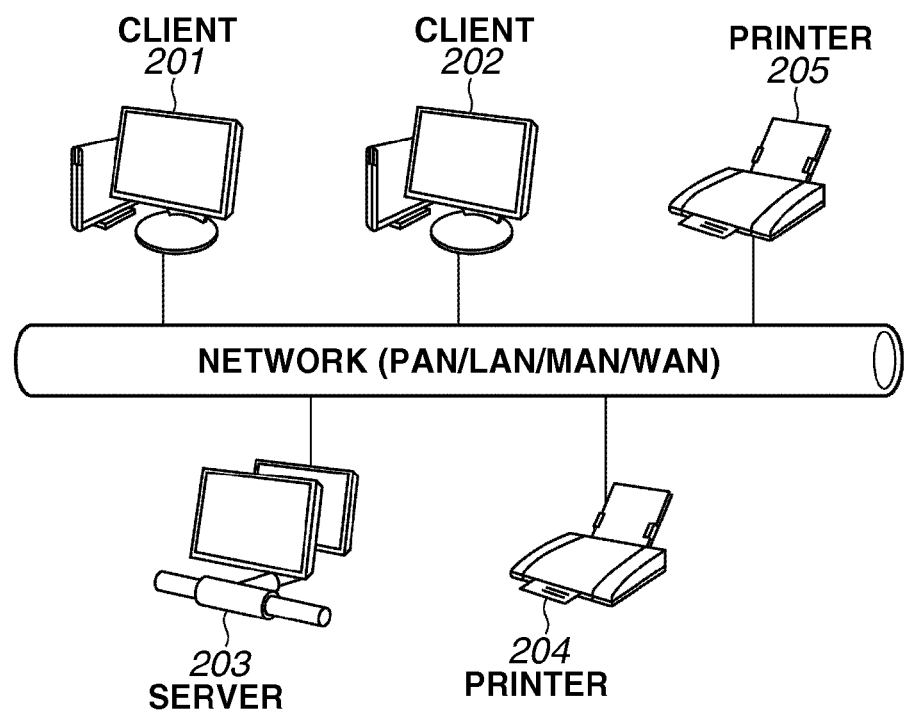
FIG. 2 illustrates a configuration of a network to which clients, a server, and printers are connected according to the exemplary embodiment of the present invention.

FIG. 2 illustrates an environment outline of the network 1061 according to the exemplary embodiment of the present invention. A single or a plurality of client computers 201 and/or client computer 202 for creating documents or images to be printed is/are connected to the network. A server computer 203 that manages users of the client computer and the printers can be connected to the network. A single or a plurality of printers 204 and/or printer 205 is/are connected to the network. The printers can be in an off-line state like the printer 205, in which although the printer is physically connected to the network, the user cannot actually use the printer.

The size of the network can range from a small network to a large network such as a personal area network (PAN), a local area network (LAN), a metropolitan area network (MAN), and a wide area network (WAN), and all of the devices are connected to the network. The servers and the printers can be connected to the network over the Internet, such as a case of cloud computing.

Figure 3:
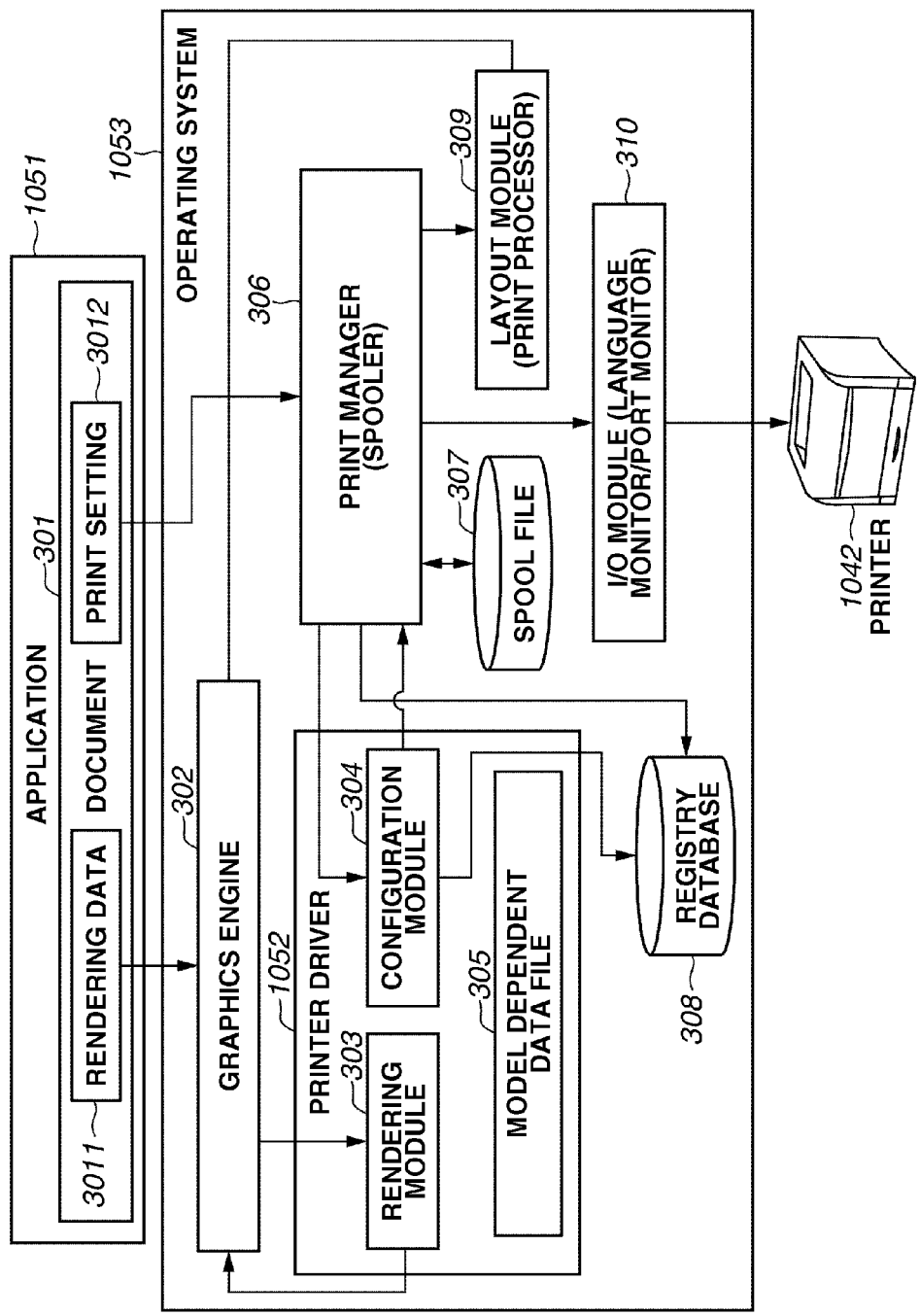
FIG. 3 is a block diagram illustrating a print processing system using a general computer according to the exemplary embodiment of the present invention.

FIG. 3 illustrates a print processing system using a general computer. The application 1051, a printer driver 1052, and an operating system 1053 are stored in the auxiliary storage unit 105 in FIG. 1. A graphics engine 302 and a print manager 306 are modules included in the operating system 1053. The user uses an input device such as the keyboard 1031 and the mouse 1032 to execute print processing of a document 301, which is created using the application program 1051 appearing on the monitor 1041 in the output device. The print processing is implemented by performing three processes, that is, selection of a printer, creation of print settings, and conversion of rendering data in this order.

First, to select a printer, the printer driver 1052 corresponding to the printer 1042 implementing the printing is selected. Next, print settings 3012 are created. A configuration module 304 in the printer driver 1052 creates initial values of the print settings 3012 of the document. The user can change and fix the created print settings 3012 such that a final print result the user is expecting can be obtained using the application 1051 or the user interface of the printer driver 1052. For example, the user can change the output paper size, and set two-sided printing and monochrome printing. The configuration module 304 provides the user interface of the printer driver 1052.

The printer driver 1052 includes two types of drivers, that is, a driver 1604 for a first environment, and a driver 1606 for a second environment described below. The flow of the print processing is changed depending on the selected driver. In this description, a flow of printing commonly performed by both drivers is described.

The print settings 3012 are saved on the RAM 1022. The storage format can be a binary data structure, an extensible markup language (XML) that is a markup language, or the like. The format varies depending on the specifications of the printer driver 1052 and the operating system 1053. The print settings 3012 are created in each document printing.

In a case where the user wants to save settings such as an optional device configuration of the printer 1042 and environmental settings for each user, the printer driver 1052 stores the settings in a registry database 308 in the operating system 1053. A print manager 306 in the operating system 1053 stores default values of the print settings 3012 for each user in the registry database 308. Lastly, the printer driver 1052 converts the rendering data.

After the creation of the print settings 3012, the user executes the print processing, and the application 1051 notifies the operating system 1053 of the execution of the print processing. The operating system 1053 performs rendering on the specified printer driver 1052 via the graphics engine 302.

In a case where layout processing is specified by the print settings 3012, before the processing proceeds to a rendering module 303 in the printer driver 1052, a temporary spool file 307 is created, and a layout module 309 is activated. In the layout processing, the order of sheets is switched or a plurality of pages are pasted in one sheet. The layout module 309 changes the layout, and performs the rendering on the printer driver 1052 again. The printer driver 1052, which received the rendering data, converts the data by using the rendering module 303 into a data language that can be interpreted by the printer, that is, a printer control language.

In this processing, the print settings 3012 are also converted into the printer control language. In many cases, both of the rendering module 303 and the configuration module 304 are common to a plurality of types of the printers 1042, and differences unique to the models are described in a model dependent data file 305. The rendering module 303 and the configuration module 304 refer to the model dependent data file 305 as needed. The converted data is sequentially stored as a spool file 307.

The print manager 306 acquires the spool file 307, and manages the schedule of the print processing as a print job file. When the printer is ready to print, the print manager 306 sequentially transmit the print job data to the printer 1042 via the I/O module 310. The print job data is a content of the print job file. The print data from the application is thus converted into the printer control language and the printing is implemented according to the above-described processing. The print data includes the rendering data and the print settings.

To create the print settings 3012 of the document 301, the print settings 3012 are directly rewritten with the application or a user interface (FIG. 7) provided from the configuration module 304 in the printer driver 1052 is used.

Figure 5:
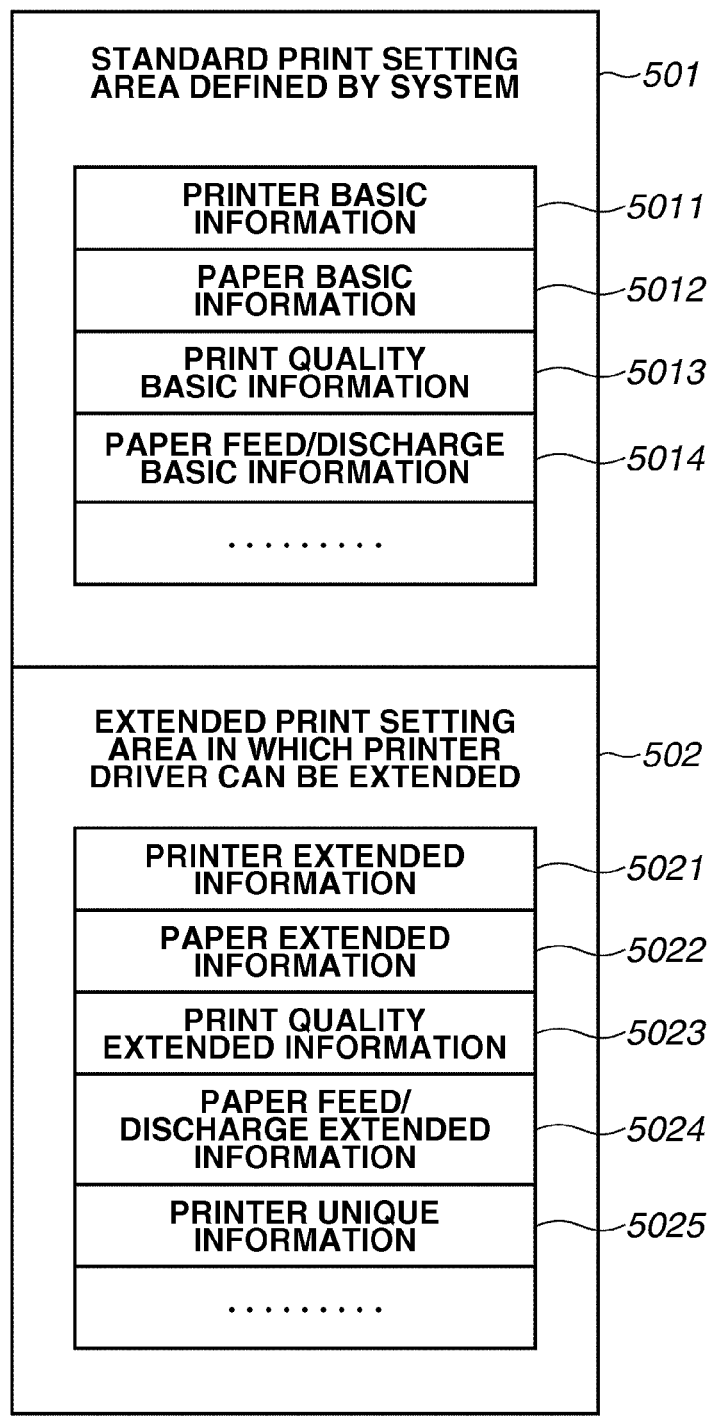
FIG. 5 is a block diagram illustrating a data structure of a DEVMODE structure as print settings according to the exemplary embodiment of the present invention.

In the Microsoft (registered trademark) Windows (registered trademark) operating systems, the print settings 3012 have the structure referred to as the DEVMODE structure illustrated in FIG. 5. The DEVMODE structure is divided into a standard setting area 501 and a setting area 502. The standard setting area 501 is publicly defined by the operating system and the setting area 502 is an area extended by the printer driver. The standard setting area 501 includes basic setting values in printing such as page sizes, switching of a paper feed stage, and switching of color and monochrome. The extended setting area 502 includes values such as discharge functions corresponding to printer options, and a fine color adjustment function. The application cannot recognize the extended settings in each printer driver 1052. Consequently, the application can directly rewrite only the standard setting area 501 that is defined by the system.

Accordingly, the application generally displays the user interface of the printer driver 1052, and the user sets the extended print settings 502. The configuration module 304 provides an application programming interface (API) in addition to the user interface.

Consequently, the user can externally set the extended print settings 502 without displaying the user interface. However, to use the API of the configuration module 304, the application is required to handle each printer driver 1052. Consequently, general application changes only the standard setting area 501.

Another printing system to which the exemplary embodiment of the present invention can be applied is described. The printing system illustrated in FIG. 3 is referred to as a GDI printing system. Meanwhile, FIG. 4 is a block diagram illustrating an XPS printing system.

In the XPS printing system, printing is performed using a document file format called an XML paper specification as spool data. Similarly to the GDI printing system, the XPS printing system runs on the operating system 1053. The print manager 306, a GDI-to-XPS conversion module 405, and a filter pipeline manager 409 are modules included in the operating system 1053. The printer driver 1052 and the individual filters in the filter pipeline manager 409 are stored in the auxiliary storage unit 105 in FIG. 1 as the printer driver 1052. The filter pipeline manager 409 is included in the operating system. However, the individual filters are modules of the printer driver 1052.

The GDI print application 401 and the XPS print application 402 are stored in the auxiliary storage unit 105 in FIG. 1 as the application 1051. The user executes the print processing using the input devices such as the keyboard 1031 and the mouse 1032 via the GDI print application program (hereinafter, referred to as GDI application) 401 or the XPS print application program (hereinafter, referred to as XPS application) 402 appearing on the monitor 1041 of the output device. The print processing is implemented by performing three processes, that is, selection of a printer, creation of print settings, and conversion of rendering data in this order.

First, the printer 1042 to be used for the printing is selected. This means to select the printer driver 1052 corresponding to the printer 1042 that executes the printing. Next, print settings are created. To set the print settings, the application reserves a memory for the print settings, and the application or the configuration module 304 of the printer driver fills the setting data using the model dependent data file 305.

In the GDI application 401, a binary DEVMODE structure 403 is used as the print setting data. In the XPS application 402, a print ticket 404 described in XML that is a markup language is used as the print setting data. The DEVMODE structure 403 and the print ticket 404 include, as the structure illustrated in FIG. 5, the standard area defined by the operating system and the extended area uniquely defined by the printer driver.

The print ticket 404 is print setting information described in an XML format, for example as illustrated in FIG. 6, and descriptions of the standard area and the extended area are separated by namespaces. The namespaces are the descriptions such as psf, psk, and xsd in FIG. 6. The specification is open to the public, and accordingly, its detailed description is omitted. In the parts described as "SKIP", the definitions of the namespaces are described.

The DEVMODE structure 403 or the print ticket 404 stores the print settings. The application directly performs rewrite to change the print settings. Dedicated settings depending on the printer 1042 are made by displaying the user interface (FIG. 7) of the printer driver 1052 stored in the configuration module 304. According to the settings input by the user via the user interface, the printer driver 1052 changes the settings depending on the printer 1042 in the DEVMODE structure 403 or the print ticket 404.

The print settings are, specifically, data necessary to perform the printing such as the output size of the sheet to "A4", two-sided printing, switching between color and monochrome, and a specified paper feed stage.

Since the print settings in the print ticket 404 are described in the XML format, it is easy to directly change and rewrite all setting values with the XPS application 402. However, the setting values can also be changed using the conventional user interface of the printer driver 1052.

The print settings are created in each document printing. In a case where the user wants to save the settings such as an optional device of the printer 1042 or environmental settings for each user, the user interface stores the settings in the registry database 308 in the operating system. The print manager 306 in the operating system stores default values of the print settings for each user in the registry database 308. Lastly, the printer driver 1052 converts the rendering data. After the print settings are fixed, the user executes the print processing via the application.

When the printing is performed via the GDI application 401, the rendering data is transmitted to the GDI-to-XPS conversion module 405 that functions as the printer driver, and an XPS spool file 407 is created. At this time, the GDI-to-XPS conversion module 405 invokes the configuration module 304, and converts the print settings from the DEVMODE structure 403 into the print ticket 404.

When the printing is performed via the XPS application 402, two methods can be provided, that is, the XPS application itself creates the XPS file, or the operating system creates the XPS file according to a rendering instruction from the XPS application. In either method, the XPS spool file 407 is created in the middle of the printing. As described above, in the XPS printing system, as its feature, the XPS spool file 407 is always created in printing.

After the creation of the XPS spool file 407 is completed, the processing proceeds to a print filter pipeline process. In the print filter pipeline process, printing is performed using a plurality of filters. A filter configuration file 413 controls the number of the filters and the order of the filters. A filter pipeline manager running in the print filter pipeline process performs the processing according to the filter configuration file 413, in this exemplary embodiment, in the order of a setting filter 410, a layout filter 411, and a renderer filter 412. The number and types of the filters differ depending on the configuration of the printer driver 1052.

The print processing is implemented by transmitting the XPS spool file 407 to the filters. The filters respectively process the XPS spool file 407 to advance the processing to the next filter, and thus the processing proceeds. Lastly, the data is output in a printer control language (hereinafter, referred to as page description language (PDL)) that is a data language the printer can interpret.

In a case where the printer 1042 is an XPS direct printer that can directly read the XPS spool file 407 and print the data, all filters can be skipped in carrying out the printing.

The setting filter 410 reads the print ticket 404 and writes data necessary for the printing in the print ticket 404. The layout filter 411 performs processing relating to the layout, for example, scaling, imposition layout in bookbinding, and stamping. The layout filter 411 operates according to the print setting print ticket 404 contained in the XPS spool file 407. Consequently, for example, in a case where a setting of imposition is not contained in the print ticket 404, the layout filter passes the XPS spool file 407 without performing any operation, and directly transmits the XPS spool file 407 to the next filter.

Lastly, in the renderer filter 412, the filter 412 performs rendering processing on the XPS spool file 407 to convert the data into a PDL. The print manager 306 managing the schedule of the print processing, manages the PDL data, and sequentially registers the print jobs in a queue. When the printer 1042 is ready to print, the PDL data is transmitted in the order recorded in the queue via the I/O monitor 310.

As described above, the main role of the printer driver is to convert the print data from the application into the printer control language to perform the print processing.

(Two Execution Environments)

Figure 16:
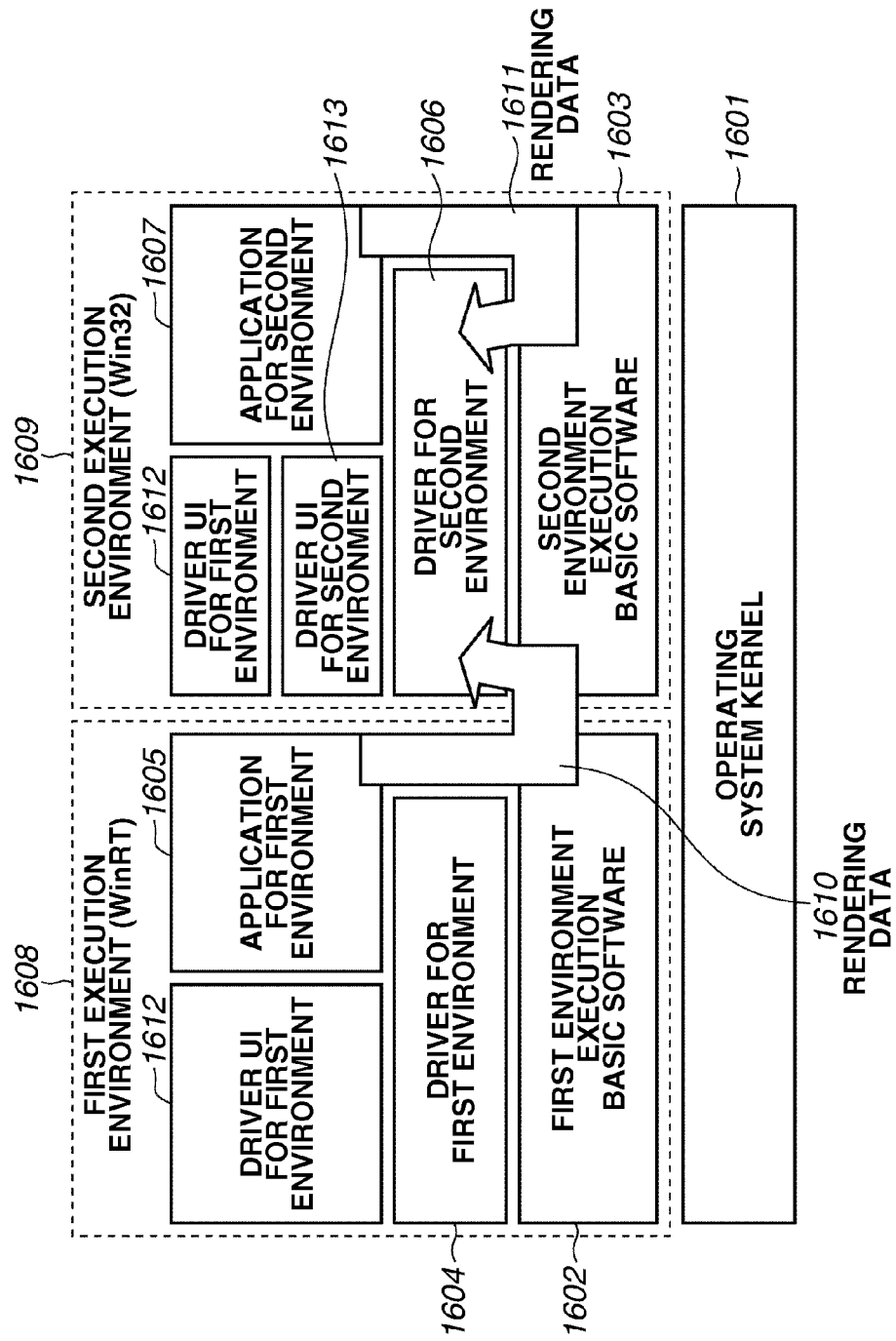
FIG. 16 illustrates a first execution environment and a second execution environment according to the exemplary embodiment of the present invention.

FIG. 16 illustrates execution environments of a new user interface (for touch panel) and a conventional user interface (for keyboard and mouse).

The new user interface is implemented in a first execution environment (WinRT) 1608 and the conventional user interface is implemented in a second execution environment (Win32) 1609. In other words, the execution environments which provide the new user interface and the conventional user interface are different.

In FIG. 16, a driver UI 1612 for the first environment is software for providing a user interface (print setting screen) for setting a driver 1604 for the first environment that is a printer driver for the first environment. Similarly, a driver UI 1613 for the second environment provides a user interface (print setting screen) for setting a driver 1606 for the second environment that is a printer driver for the second environment. Application 1605 for the first environment and application 1607 for the second environment are general application such as a word processor which issues a print instruction to the printer drivers.

The application 1605 for the first environment and the driver 1604 for the first environment run on first environment execution basic software 1602. Thus, the first execution environment (WinRT) 1608 is configured. The application 1607 for the second environment and the driver 1606 for the second environment, and the driver UI 1613 for the second environment run on second environment execution basic software 1603. Thus, the second execution environment (Win32) 1609 is configured. The two execution environments run on an operating system kernel 1601.

The driver UI 1612 for the first environment runs on the operating system kernel 1601. In that operation, while the driver UI 1612 for the first environment is running on the first execution environment (WinRT) 1608, a user interface for touch panel is provided. While the driver UI 1612 for the first environment is running on the second execution environment (Win32) 1609, a user interface for keyboard and mouse is provided.

The operating system 1053 is composed of the first environment execution basic software 1602, the second environment execution basic software 1603, and the operating system kernel 1601. In the following flowcharts where the operating system 1053 performs the processing, one of the software programs is operated to implement the processing.

The flow of the processing in selecting the driver 1606 for the second environment from the application 1605 for the first environment and performing the printing is described. First, the user selects the driver 1606 for the second environment from the application 1605 for the first environment, and instructs to execute the printing. The first environment execution basic software 1602 receives the rendering data 1610 created by the application 1605 for the first environment.

Figure 4:
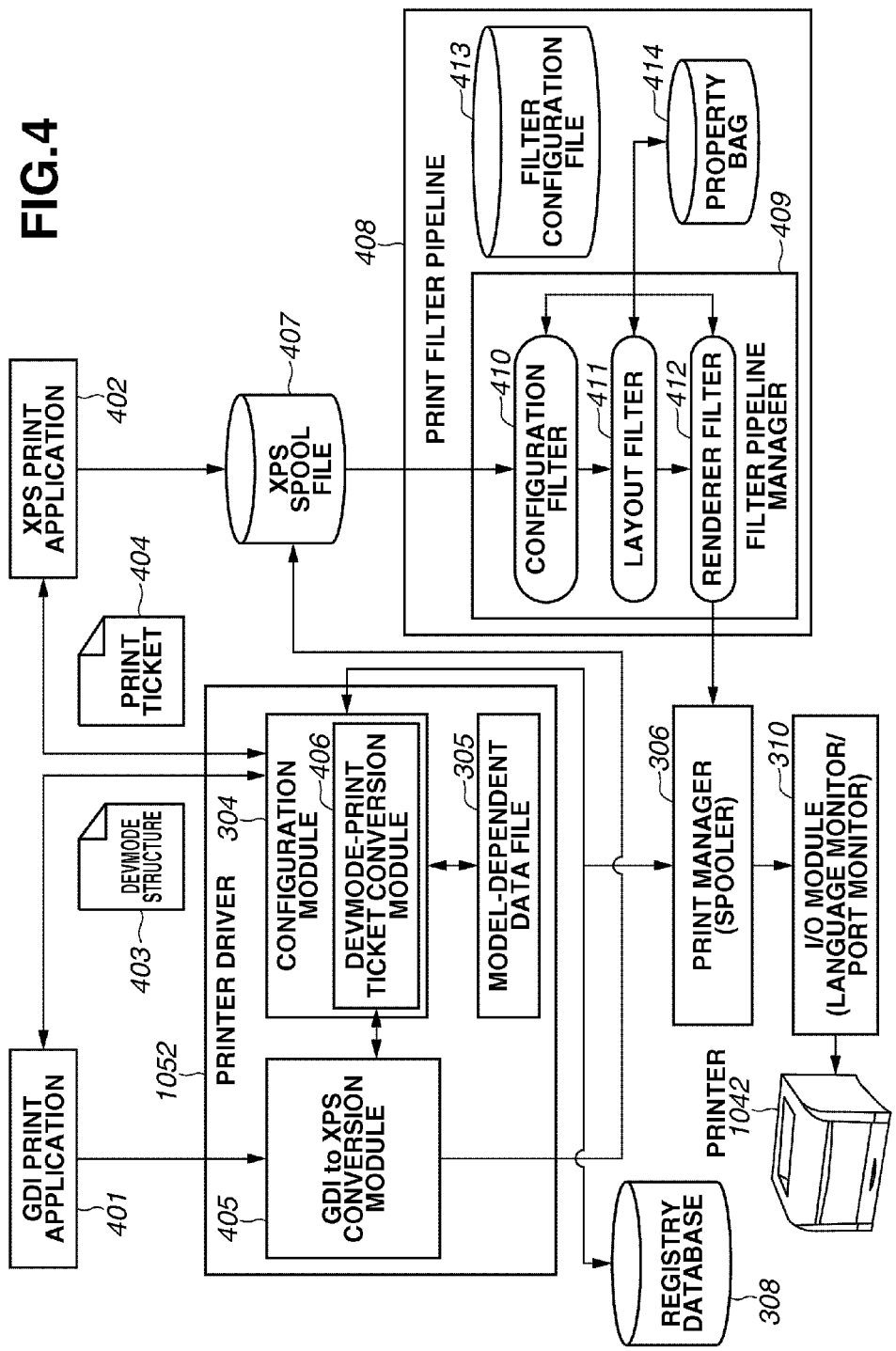
FIG. 4 is a block diagram illustrating an XPS print processing system according to the exemplary embodiment of the present invention.

Points in the processing which are different from the print flow described with reference to FIGS. 3 and 4 are described. The first environment execution basic software 1602 transmits the received rendering data 1610 to the second environment execution basic software 1603. Thus, the processing transmits the rendering data 1610 from the first execution environment (WinRT) 1608 to the second execution environment (Win32) 1609. The second environment execution basic software 1603 starts the driver 1606 for the second environment selected by the user, the rendering data 1610 is transmitted to the driver 1606 for the second environment 1606, and thereby print data is created.

In another printing method, the application 1607 for the second environment selects the driver 1606 for the second environment and performs the printing. In this method, the application 1607 for the second environment transmits rendering data 1611 to the driver 1606 for the second environment via the second environment execution basic software 1603. The print flow in this method is similar to that described with reference to FIGS. 3 and 4, and consequently, the description of the flow is omitted.

As illustrated in FIG. 16, the driver UI 1613 for the second environment does not run on the first execution environment (WinRT) 1608. In such an environment, the present specification describes a method of converting setting items that can be set using the driver UI 1613 for the second environment into setting items for the first execution environment (WinRT) 1608 to provide a user interface (print setting screen) of the driver 1606 for the second environment.

In the above description made with reference to FIG. 16, to facilitate the understanding, the drivers and the driver UIs are separately described. In the description below, the drivers and the driver UIs are not specifically separated, and software implemented by one of or both of the driver and the driver UI is referred to as a printer driver.

(Print Setting)

Figure 8:
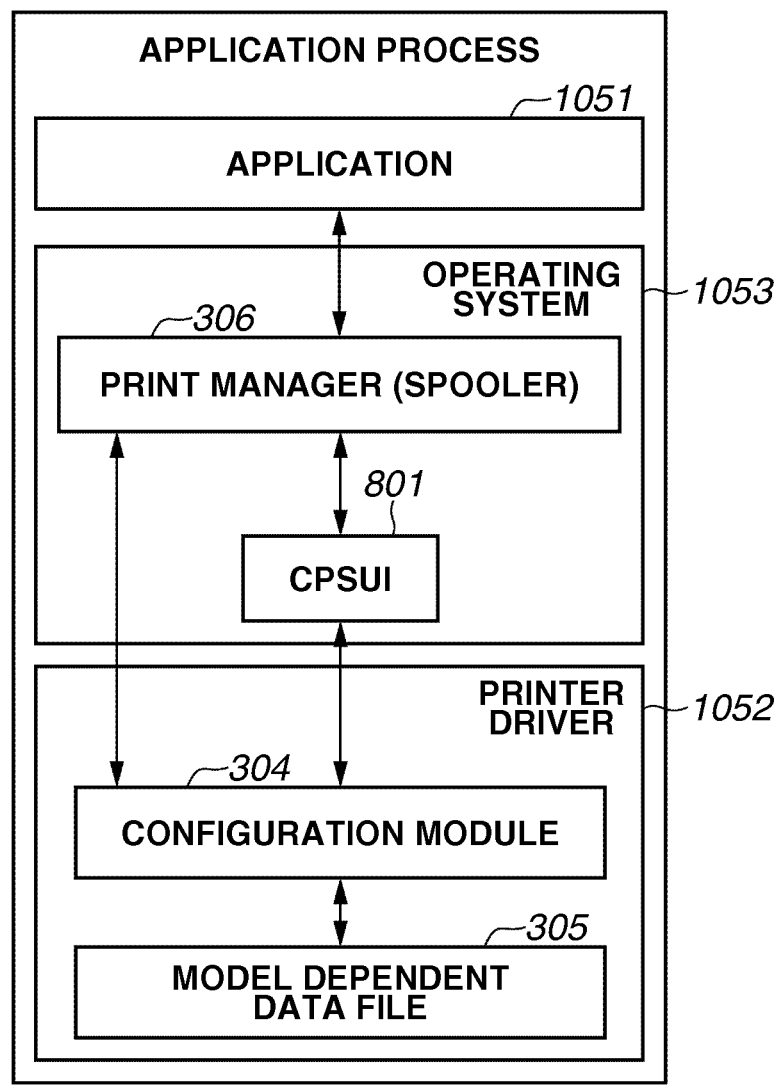
FIG. 8 is a block diagram illustrating processing for invoking a user interface of a printer driver according to the exemplary embodiment of the present invention.

Processing for performing print setting using the user interface of the printer driver 1052 is described with reference to the block diagram in FIG. 8 and the flowchart in FIG. 11.

In step S1101, the operating system 1053 invokes an API for using the printer driver 1052 from the application 1051. In step S1102, the operating system 1053 transmits the DEVMODE structure 403 transmitted from the application 1051 via the print manager 306 to the configuration module 304 of the printer driver 1052. In step S1103, the operating system 1053 checks whether a flag for displaying the user interface of the printer driver 1052 is transmitted via the API from the application 1051.

In displaying the user interface, the operating system 1053 invokes the printer driver 1052 and prepares to establish a user interface.

The print manager 306 of the operating system 1053 invokes a Common Property Sheet User Interface (CPSUI) 801. The CPSUI 801 creates a platform to be a base in user interface referred to as a property sheet having tabs (FIG. 15J). The plat form is, in FIG. 7, the part where the OK button and the cancel button are disposed.

In step S1104, to create a property sheet page in each tab, the CPSUI 801 of the operating system 1053 receives a dialogue resource template (FIG. 9) from the configuration module 304 of the printer driver 1052.

The dialogue resource template is a binary file for creating a dialogue that is also used in general application other than the print setting. Generally, at the same time when, or after the configuration module 304 is read, the configuration module 304 reads the dialogue resource template from the auxiliary storage unit 105 to the RAM 1022. The CPU 101 performs the following processing according to the dialogue resource template. The configuration module 304 includes the dialogue resource template such that the configuration module 304 can transmit the dialogue resource template when the configuration module 304 is invoked via the API or the like from the operating system 1053. The operating system reads the dialogue resource template as layout information and creates a graphical user interface (GUI).

The operating system 1053 can display a new user interface for touch panel simultaneously with the display of the conventional UI using the keyboard and mouse. This processing can be implemented with, for example, vertically divided screens of the new user interface for touch panel displayed on the left and the conventional user interface displayed on the right.

Consequently, the application is required to determine by itself whether the application is started by the conventional user interface for mouse or by the new user interface for touch panel. To make the determination, when the application is started, the operating system 1053 can transmit information indicating a user interface which starts the application, to the application. Alternatively, the application itself can make an inquiry about the user interface which has started the application, to the operating system 1053.

In this exemplary embodiment, in step S1105, the operating system 1053 determines whether the application that invoked the printer driver 1052 is running on the new user interface.

In other words, the operating system 1053 determines whether the application is the application 1605 for the first environment or the application 1607 for the second environment.

If the invoked application is running on the conventional user interface (NO in step S1105), in step S1106, according to the received dialogue resource template, the operating system 1053 arranges the described controls as it is to create a user interface.

In the specification, the controls correspond to the objects illustrated in FIGS. 15A to 15J.

If the invoked application is running on the new user interface (YES in step S1105), in step S1107, the operating system 1053 determines whether the printer driver is the printer driver 1052 that is compliant with the new user interface for touch panel.

In other words, the operating system 1053 determines whether the printer driver 1052 is the driver 1604 for the first environment or the driver 1606 for the second environment.

Alternatively, the determination can be made depending on whether the new user interface for touch panel is being displayed without determining whether the application that invoked the printer driver 1052 is running on the new user interface. Alternatively, in a case where only one of the new screen for touch panel and the conventional screen using the keyboard and mouse can be displayed, the determination can be made depending on which screen is being used.

When the printer driver 1052 is installed, the printer driver 1052 registers in advance whether the user interface is for mouse or for touch panel in the operating system 1053. Consequently, the operating system 1053 can determine whether the user interface is registered for the new interface for touch panel in the printer driver.

In the present specification, as described above, whether the printer driver is the printer driver 1052 complying with the new user interface for touch panel is determined. However, the processing after step S1109 can be always performed. For example, a mode for always executing the processing after step S1109 such as a forcible execution mode can be provided. In the forcible execution mode, the processing after step S1109 is always implemented.

Advantages of the determination whether the printer driver is the printer driver 1052 that is compliant with the new user interface for touch panel are described. In this case, print settings can be performed using the user interface for touch panel even if the printer driver 1052 complying with the new user interface for touch panel has a dialogue resource template for a conventional screen. Consequently, the user can use the user interface without recognizing whether the print settings are converted from the dialogue resource template into settings for the new user interface for touch panel or settings made by the printer driver 1052.

Since the dialogue resource template is for the conventional screen, if the printer driver 1052 has the new user interface for touch panel (YES in step S1107), in step S1108, the operating system 1053 starts the user interface. In other words, if the printer driver 1052 includes the driver UI 1612 for the first environment, the operating system 1053 starts the driver UI 1612 for the first environment.

If the printer driver 1052 (the driver 1606 for the second environment) includes only the dialogue resource template (NO in step S1107), in step S1109, the operating system 1053 converts the controls described in the dialogue resource template and establishes a user interface. Detailed description will be made below with reference to FIG. 12.

In step S1110, the operating system 1053 invokes the initialization program of the user interface of the printer driver 1052.

In step S111, after the completion of the initialization, the operating system 1053 invokes a window message of the user interface of the printer driver 1052. In response to the operation of the user, the operating system 1053 transmits each window message to the printer driver 1052. The printer driver 1052 processes the window message, and returns the processing to the operating system 1053 again. In step S1112, if an instruction of ending the user interface is transmitted by the operation of the user, the operating system 1053 receives the window end message, and ends the processing of the user interface.

In step S1113, the operating system 1053 acquires the DEVMODE structure 403 of the print settings changed by the operation of the user interface from the printer driver 1052. In step S1114, the operating system 1053 returns the changed DEVMODE structure 403 to the application 1051, and thereby the print settings changed via the user interface can be reflected.

The dialogue resource template describes an ID associated with the type, attributes, location, and program of the control arranged on the property sheet page. For example, the sixth line in FIG. 9 indicates that the type of the control is COMBOBOX, the ID is IDC_CB_PROFILE, and the location is 60, 4, 90, and 100, and the others indicate the attributes.

The ID is assigned to a control to specify the control. For example, using the ID, the configuration module 304 adds a candidate of the COMBOBOX, and acquires the value currently being selected.

The controls are parts in the user interface included in the operating system 1053. Typical parts are described below.

A TEXT displays a character string, and includes three types depending on the arrangement of the characters, that is, a LTEXT, a RTEXT, and a CTEXT. FIG. 15A illustrates the COMBOBOX. The use of the COMBOBOX enables selection of one option from the list of mutually exclusive options. FIG. 15B illustrates a CHECKBOX. The use of the CHECKBOX enables selection of one option from two obviously distinct options. FIG. 15C illustrates an EDITTEXT. The use of the EDITTEXT enables display, input, and edition of texts and values.

FIG. 15D illustrates a PUSHBUTTON. The use of PUSHBUTTON enables execution of an action. FIG. 15E illustrates a LISTBOX. The use of the LISTBOX enables selection of one item from a list that is always on display. FIG. 15F illustrates a WC_LISTVIEW of CONTROL. The use of the WC_LISTVIEW enables display and operation of a single or a plurality of pieces of selected data. FIG. 15G illustrates a TRACKBAR_CLASS of CONTROL. The use of the TRACKBAR_CLASS enables selection of one value from a range of sequential values. FIG. 15H illustrates an UPDOWN_CLASS of CONTROL. The use of the UPDOWN_CLASS enables change of values in an associated EDITTEXT by one unit.

FIG. 15I illustrates a WC_TREEVIEW of CONTROL. The use of the WC_TREEVIEW enables display and operation of a single or a plurality of hierarchical collections. The operating system 1053 receives the dialogue resource template including these controls for each property sheet from the printer driver 1052, and establishes a user interface.

Figure 12:
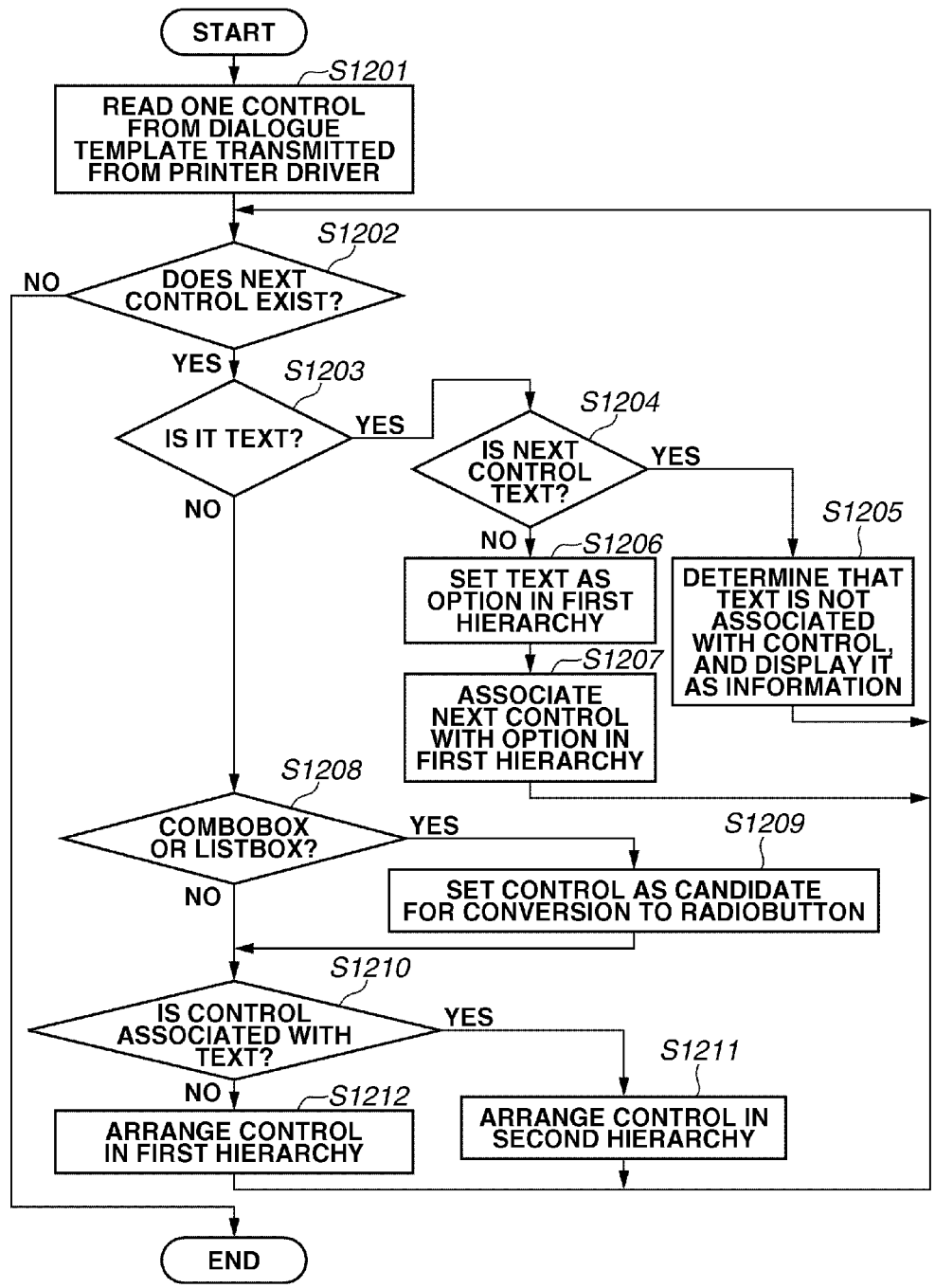
FIG. 12 is a flowchart for the processing performed when the operating system converts a dialogue resource template received from the printer driver according to the exemplary embodiment of the present invention.

With reference to the flowchart in FIG. 12 that is within the processing in step S1109, it is described how the operating system 1053 converts the dialogue resource template transmitted from the printer driver 1052 into the user interface for touch panel.

As described above, the configuration module 304 of the printer driver 1052 includes the dialogue resource template. In step S1201, the operating system 1053 reads the dialogue resource template transmitted from the printer driver 1052 one line at a time, and acquires one control. In step S1202, the operating system 1053 continues the processing until all controls are read.

In step S1203, if the read control is a TEXT (YES in step S1203), the operating system 1053 reads the next control and analyzes the control.

In step S1204, if the next control is also a TEXT (YES in step S1204), the operating system 1053 reads the RAM 1022, and determines that the TEXT is not associated with other controls. In step S1205, the operating system 1053 arranges the control as a TEXT to be displayed as information.

In the following processing, when association of a control is performed, the operating system 1053 stores the association in the RAM 1022. The association is determined by the operating system 1053 by reading the information in the RAM 1022.

If the control next to the TEXT is another control (NO in step S1204), in step S1206, the operating system 1053 determines that the TEXT is one of options in a first hierarchy, and lists the options. The first hierarchy is a page displayed first when the user opens the user interface. When the screens are switched in response to pressing operation of an option item or a button, a second hierarchy, a third hierarchy, and subsequent hierarchies are sequentially displayed. The first hierarchy is laid out with the lined up options of the TEXT (FIG. 10A).

In the specification, the TEXTs are referred to with names of the print setting items.

In FIG. 10A, the user selects a TEXT (the name of the print setting item) in the first hierarchy and the screen proceeds to the screen in FIG. 10B for fixing the individual setting. At that time, the screen in FIG. 10A is replaced with the screen in FIG. 10B, and displayed. The replacement means that the same area as the screen of FIG. 10A is overwritten by the screen of FIG. 10B, and after the screen of FIG. 10B is displayed, the screen of FIG. 10A is not displayed and thus the screen transition is performed. Specifically, on the screen of FIG. 10B, the TEXTs (the names of the print setting items) displayed in FIG. 10A are erased (hidden) from the screen. Instead of the TEXTs, in FIG. 10B, the RADIOBUTTONs are arranged and the options of the print setting item are displayed.

In FIG. 10A, the names of the print setting items are displayed without displaying the options of the print setting items. In FIG. 10B, the options of the print setting item are displayed without displaying the names of the print setting items. By this processing, even if the monitor 1041 is a small device, the information to be displayed can be reduced, and the font sizes of the name of the print setting item and the options of the print setting item can be increased. As a result, an easily viewable user interface can be provided. If the options of the print setting item are displayed using a COMBOBOX or a LISTBOX, all of the options are not simultaneously displayed.

In step S1207, the operating system 1053 associates the next control found in step S1204 as an option of the arranged TEXT.

In step S1208, if the read control is a COMBOBOX or a LISTBOX, in step S1209, the operating system 1053 sets the control as a change candidate of control as a RADIOBUTTON.

In step S1210, the operating system 1053 determines whether the acquired control is associated with the TEXT in step S1207.

If the control is associated with the TEXT (YES in step S1210), in step S1211, the operating system 1053 arranges the control in the second hierarchy. If the control is not associated with the TEXT (NO in step S1210), in step S1212, the operating system 1053 arranges the control in the first hierarchy.

With the above-described processing, the controls in the dialogue resource template are converted and the user interface is established.

In the user interface for touch panel, the positional coordinates for locations, the type and size of the font described in the dialogue resource template are ignored. With respect to the locations, the space for arranging the conventional controls is small, and the same layout cannot be achieved. Consequently, even if a scroll bar or the like is used to maintain the same layout, the operability is significantly decreased.

To solve the problem, the controls are sequentially arranged from the top along one line.

The order of the arrangement is the order of the controls that read the dialogue resource template.

With respect to the type and size of the font, if the font is directly used, the display is too small. In such a case, on a small monitor such as a touch panel, the recognition of the characters is difficult. To solve the problem, the default font and size used on the user interface for touch panel are used as it is. In the user interface for touch panel, the property sheet page is displayed on the entire of the screen, and the font size is large. Consequently, if the functional name and the control are arranged at the same time, the operability is decreased.

To solve the problem, in the first hierarchy, only the functional names are listed. The user clicks a name, and selection can be made using the control corresponding to the function. If the user uses a COMBOBOX or a LISTBOX, it is hard for the user to recognize an area where the user can select the individual items by touching the touch panel. Consequently, the COMBOBOX and the LISTBOX are changed to RADIOBUTTONs to facilitate the recognition of the touch position.

In the present specification, the COMBOBOX and the LISTBOX are changed to the RADIOBUTTONs. Alternatively, the COMBOBOX and the LISTBOX can be directly displayed.

Alternatively, a control referred to as OWNERDRAW which performs rendering by a program can be used. According to the OWNERDRAW, the printer driver 1052 (the driver 1606 for the second environment) performs the rendering, and consequently, replacement with another control or font cannot be performed. To solve the problem, a control is arranged only in the secured rendering area, and the rendering is performed.

With reference to the flowchart in FIG. 13 that is within the processing in step S1110, the flow of actually converting the control set as a candidate to be converted into a RADIOBUTTON in step S1209 into the RADIOBUTTON is described below.

Figure 13:
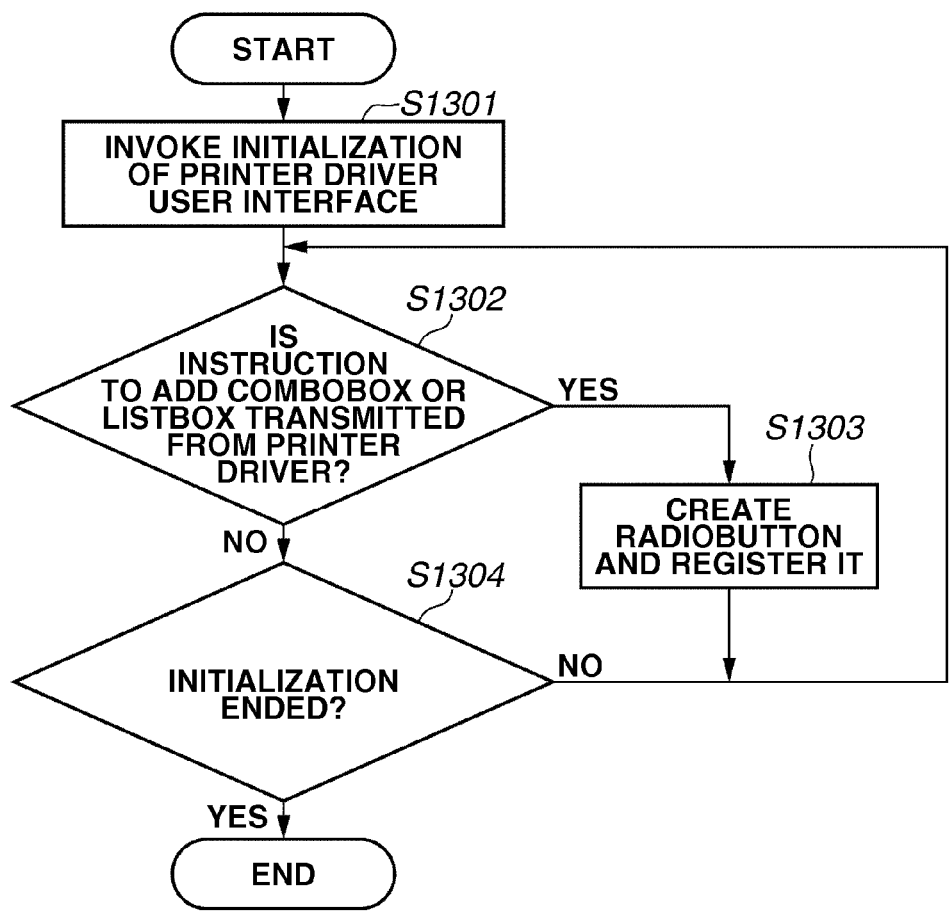
FIG. 13 is a flowchart for the processing performed when the operating system converts a COMBOBOX and a LIST-BOX in an initialization logic of the printer driver according to the exemplary embodiment of the present invention.
Figure 14:
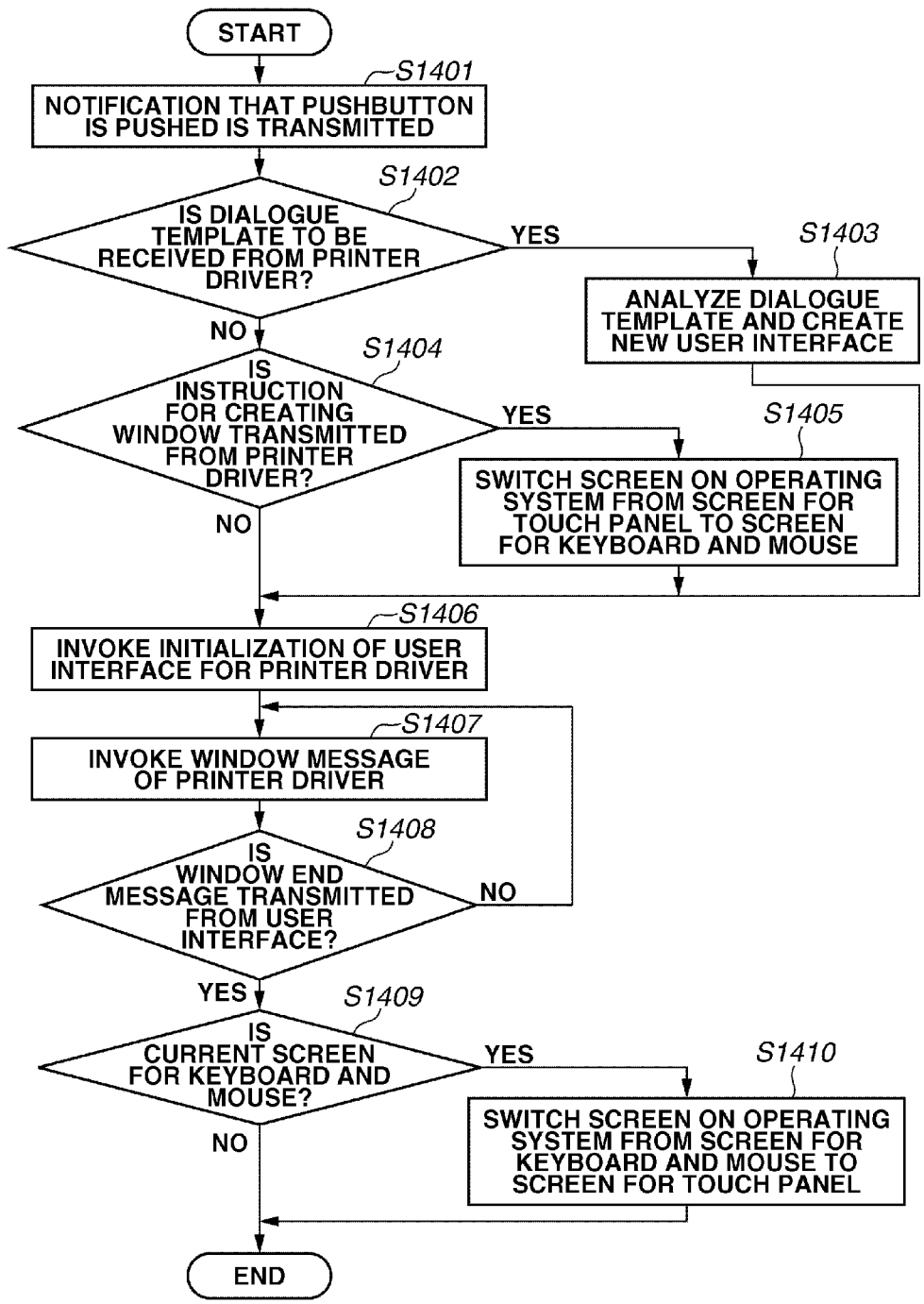
FIG. 14 is a flowchart for the processing performed when a button for opening a second hierarchy by the operating system is pressed according to the exemplary embodiment of the present invention.

The printer driver 1052 described with reference to FIGS. 13 and 14 is the driver 1606 for the second environment.

In step S1301, the operating system 1053 invokes the initialization program of the user interface of the printer driver 1052.

In step S1302, the operating system 1053 determines whether the printer driver 1052 has invoked an instruction for adding an item of an option to the COMBOBOX or the LISTBOX during the initialization processing. If the instruction for adding the item of the option is invoked (YES in step S1302), the operating system 1053 arranges the RADIOBUTTONs.

FIG. 10B illustrates the user interface created by the processing. In step S1304, if the initialization of the user interface by the printer driver 1052 is completed, the operating system 1053 proceeds to the next processing.

The operating system 1053 determines that the order of the arrangement of the RADIOBUTTONs is the order that the instructions for adding the items of the options are received from the printer driver 1052.

The operating system 1053 analyzes the character strings of the items and determines that three or more character strings determined to be page sizes are added, the operating system 1053 determines that the items are RADIOBUTTONs for selecting a page size.

The character strings for determining the page sizes include "A3", "A4", "A5", "B3", "B4", "B5", "LETTER", "LEDGER", "11×17", "EXECUTIVE", "POSTCARD", and "ENVELOPE". The three or more character strings are required because it should be determined whether the control is different from a control for selecting a default sheet in which only "A4" and "LETTER" are listed.

If the operating system 1053 determines that the items are for the page sizes, the operating system 1053 rearranges the items such that the TEXT in the first hierarchy associated with the RADIOBUTTON is located at the top. Since the control for selecting a page size has a high priority for the user, the TEXT is moved to the conspicuous position at the top.

With reference to the flowchart in FIG. 14 that is within the processing in step S1111, the flow for opening the second hierarchy and the third hierarchy of the conventional user interface screen included in the user interface of the printer driver 1052 is described.

The second hierarchy and the third hierarchy of the conventional user interface screen are screens invoked using a button such as the page option in FIG. 7.

In step S1401, the operating system 1053 is notified from the printer driver 1052 that the PUSHBUTTON is pressed.

After the PUSHBUTTON is pressed, in step S1402, the operating system 1053 determines whether to receive the dialogue resource template from the printer driver 1052. The operating system 1053 can determine whether to receive the dialogue resource template depending on whether the API for receiving the dialogue resource template is invoked.

If the operating system 1053 receives the dialogue resource template (YES in step S1402), in step S1403, similarly to the case of the first hierarchy, the operating system 1053 analyzes the dialogue resource template, and establishes a new user interface for touch panel. In this processing, for the ID of the control of the established new user interface, the ID of the control specified in the dialogue resource template is directly used. Therefore, the configuration module 304 can specify the control even if the UI is changed.

If the operating system 1053 does not receive the dialogue resource template (NO in step S1402), in step S1404, the operating system 1053 determines whether an instruction for creating a window is transmitted from the printer driver 1052.

If the instruction for creating a window is transmitted from the printer driver 1052 (YES in step S1404), the operating system 1053 determines that an instruction is given to open the second hierarchy. In step S1405, the operating system 1053 switches the screen to the conventional user interface for keyboard and mouse from the user interface for touch panel.

By switching the screen to the conventional screen, the operating system 1053 can display a conventional window created by the printer driver 1052 other than the dialogue.

In step S1406, the operating system 1053 invokes the initialization program of the user interface of the printer driver 1052. In step S1407, the operating system 1053 invokes a window message, and starts the processing of the second hierarchy.

The DEVMODE structure 403 that indicates the print settings has already been transmitted to the printer driver 1052 (S1102), and the printer driver 1052 is not unloaded. Consequently, the print settings can be directly used.

In step S1408, if the operating system 1053 receives a window end message from the user interface of the printer driver 1052 (YES in step S1408), the operating system 1053 starts the end processing of the user interface.

In step S1409, the operating system 1053 determines whether the current screen is the conventional user interface screen for keyboard and mouse. If the screen is the conventional user interface screen (YES in step S1409), in step S1410, the operating system 1053 switches the screen to the new user interface screen for touch panel.

As described above, the operating system 1053 uses the dialogue resource template for the conventional user interface included in the printer driver 1052 to establish the new user interface screen for touch panel.

Accordingly, the user can use the user interface optimized for touch panel irrespective of the type of the printer driver.

Further, the user interfaces uniquely created by the printer driver such as the second hierarchy and the third hierarchy can be properly displayed with the switching operation to the conventional screen.

Further, the establishment of the user interface with the controls and the layout suitable for touch panel can achieve a unified operational feeling.

In the description of step S1105 in FIG. 11, the control is performed depending on whether the application is executed in the first execution environment or the second execution environment. Alternatively, two applications can be used in the first execution environment or in the second execution environment, and in step S1105, the user interface to be displayed can be changed depending on a determination which of the two applications is running.

According to the exemplary embodiment of the present invention, the new user interface suitable for touch panel can be displayed even if the conventional printer driver is used, and consequently, operational difficulty in the processing can be reduced. Further, the easy-to-use user interface can be displayed without a new printer driver.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-198164 filed Sep. 12, 2011 and No. 2012-143141 filed Jun. 26, 2012, which are hereby incorporated by reference herein in their entirety.

What is claimed is:

1. An information processing apparatus comprising:
a reception unit configured to receive interface information containing a type of a control and an ID of a function corresponding to the control from a printer driver;
a first determination unit configured to determine whether an application that invoked the printer driver is being executed in a first execution environment or in a second execution environment;
a second determination unit configured to determine whether the printer driver is able to display a user interface for the first execution environment; and
a display unit configured to replace the control described in the interface information with a control of a user interface in the second execution environment and display a user interface according to the interface information in which the control described therein was replaced if the first determination unit determined that the application is being executed in the first execution environment and the second determination unit determined that the printer driver is not able to display the user interface for the first execution environment, and display the control of the user interface in the second execution environment according to the interface information if the application is being executed in the second execution environment.

2. A non-transitory recording medium storing a program for instructing a computer to function as an information processing apparatus comprising:
a reception unit configured to receive interface information containing a type of a control and an ID of a function corresponding to the control from a printer driver;
a first determination unit configured to determine whether an application that invoked the printer driver is being executed in a first execution environment or in a second execution environment;
a second determination unit configured to determine whether the printer driver is able to display a user interface for the first execution environment; and
a display unit configured to replace the control described in the interface information with a control of a user interface in the second execution environment and display a user interface according to the interface information in which the control described therein was replaced if the first determination unit determined that the application is being executed in the first execution environment and the second determination unit determined that the printer driver is not able to display the user interface for the first execution environment, and display the control of the user interface in the second execution environment according to the interface information if the application is being executed in the second execution environment.

3. A control method comprising the steps of:
receiving interface information containing a type of a control and an ID of a function corresponding to the control from a printer driver;
first determining whether an application that invoked the printer driver is being executed in a first execution environment or in a second execution environment;
second determining whether the printer driver is able to display a user interface for the first execution environment;
replacing the control described in the interface information with a control of a user interface in the second execution environment; and
displaying a user interface according to the interface information in which the control described therein was replaced if the first determining determines that the application is being executed in the first execution environment and the second determining determines that the printer driver is not able to display the user interface for the first execution environment, and displaying the control of the user interface in the second execution environment according to the interface information if the application is being executed in the second execution environment, wherein the steps are executed by at least one processor.

4. The information processing apparatus according to claim 1, wherein the reception unit receives a dialogue resource template from the printer driver and reads the dialogue resource template, and wherein the display unit displays a print setting screen of the printer driver invoked by the application.

5. The information processing apparatus according to claim 4, wherein the display unit replaces a COMBOBOX and a LISTBOX described in the dialogue resource template into RADIOBUTTONs and displays the print setting screen of the printer driver invoked by the application.

6. The information processing apparatus according to claim 4, wherein if the display unit displays the print setting screen of the printer driver invoked by the application, and receives an instruction to create a window from the printer driver, the display unit switches a screen of an operating system from the second execution environment to the first execution environment.

7. The information processing apparatus according to claim 6, wherein if the reception unit receives a window end message from the printer driver, the display unit switches the screen of the operating system from the first execution environment to the second execution environment.

8. The control method according to claim 3, further comprising receiving a dialogue resource template from the printer driver and reading the dialogue resource template, and wherein the displaying displays a print setting screen of the printer driver invoked by the application.

9. The control method according to claim 8, further comprising replacing a COMBOBOX and a LISTBOX described in the dialogue resource template into RADIOBUTTONs and displaying the print setting screen of the printer driver invoked by the application.

10. The control method according to claim 8, further comprising, if the displaying displays the print setting screen of the printer driver invoked by the application, and an instruction to create a window from the printer driver is received, the displaying switches a screen of an operating system from the second execution environment to the first execution environment.

11. The control method according to claim 10, further comprising, if the receiving receives a window end message from the printer driver, the displaying switches the screen of the operating system from the first execution environment to the second execution environment.

* * * * *